(12) United States Patent
Shu et al.

(10) Patent No.: US 11,748,426 B2
(45) Date of Patent: Sep. 5, 2023

(54) PERSONALIZED COMMENT RECOMMENDATION METHOD BASED ON LINK PREDICTION MODEL OF GRAPH BIDIRECTIONAL AGGREGATION NETWORK

(71) Applicants: SHANDONG ARTIFICIAL INTELLIGENCE INSTITUTE, Jinan (CN); QILU UNIVERSITY OF TECHNOLOGY, Jinan (CN); SHANDONG COMPUTER SCIENCE CENTER (NATIONAL SUPERCOMPUTER CENTER IN JINAN), Jinan (CN)

(72) Inventors: Minglei Shu, Jinan (CN); Muchen Wang, Jinan (CN); Yinglong Wang, Jinan (CN); Zhao Li, Jinan (CN); Tianlei Gao, Jinan (CN)

(*) Notice: Subject to any disclaimer, the term of this patent is extended or adjusted under 35 U.S.C. 154(b) by 0 days.

(21) Appl. No.: 18/105,891

(22) Filed: Feb. 6, 2023

(65) Prior Publication Data
US 2023/0185865 A1    Jun. 15, 2023

Related U.S. Application Data

(63) Continuation-in-part of application No. PCT/CN2021/131595, filed on Nov. 19, 2021.

(30) Foreign Application Priority Data

Jun. 18, 2021 (CN) .......................... 202110683196.9

(51) Int. Cl.
*G06F 16/9535* (2019.01)
*G06Q 50/00* (2012.01)

(52) U.S. Cl.
CPC ......... *G06F 16/9535* (2019.01); *G06Q 50/01* (2013.01)

(58) Field of Classification Search
CPC ............. G06F 16/9535; G06F 16/9536; G06F 16/9538; G06F 16/951; G06F 16/953; G06F 16/9532
See application file for complete search history.

(56) References Cited

U.S. PATENT DOCUMENTS

| 2007/0192350 A1 | 8/2007 | Gao et al. |
| 2015/0242967 A1* | 8/2015 | Shsh ...................... G06Q 50/01 705/319 |

(Continued)

FOREIGN PATENT DOCUMENTS

| CN | 103116639 A | 5/2013 |
| CN | 103309972 A | 9/2013 |

(Continued)

*Primary Examiner* — Kris E Mackes

(57) ABSTRACT

A personalized comment recommendation method based on a link prediction model of a graph bidirectional aggregation network. In a user-comment bipartite graph, comment features are aggregated into a user feature. A social network is used to fuse a neighbor feature of a user to obtain an embedding representation of the user. The embedding representation of the user is aggregated into a comment after an original feature of the user is removed, and the embedding representation of the user is adjusted based on a difference before and after comment aggregation. On this basis, a forwarding network is used to calculate a score of an edge based on an inner product of user node features at both ends of the edge, and finally make a recommendation based on the score. Furthermore, a recommendation system converts a comment recommendation task into a link prediction task between users in a small range.

7 Claims, 3 Drawing Sheets

(56) References Cited

U.S. PATENT DOCUMENTS

2020/0160188 A1    5/2020  Zhao et al.
2021/0304281 A1*   9/2021  Goshen .............. G06Q 30/0201
2022/0256002 A1*   8/2022  Cetintas ............. H04L 67/1089
2022/0318715 A1*  10/2022  Goel .................... G06N 3/045

FOREIGN PATENT DOCUMENTS

CN    112069402 A    12/2020
CN    113434756 A     9/2021

* cited by examiner

PERSONALIZED COMMENT RECOMMENDATION METHOD BASED ON LINK PREDICTION MODEL OF GRAPH BIDIRECTIONAL AGGREGATION NETWORK

CROSS REFERENCES OF THE RELATED APPLICATIONS

This application is a continuation-in-part application of PCT/CN2021/131595 filed on Nov. 19, 2021, which is based on and claims priority to Chinese patent application No. 202110683196.9 filed on Jun. 18, 2021, the entire contents of which are incorporated herein by reference.

TECHNICAL FIELD

The present disclosure relates to the technical field of personalized comment recommendations and, in particular, to a personalized comment recommendation method based on a link prediction model of a graph bidirectional aggregation network.

BACKGROUND

Internet "trolls" have existed for a long time. Relevant studies have found that the best strategy to deal with these "trolls" is to not respond to them. Although a comment itself has been screened using reverse chronological order, popularity, manual review, and the like, the problem of "trolls" still has not been resolved. The development of a recommendation system helps to resolve this problem, but the quality of a recommendation result greatly depends on the quality of an input feature. Most of the existing methods are intended to extract independent data of the same type. Although these methods have a certain expression capability, due to a lack of associated information, a feature obtained only from the same type of data can no longer meet the development demand of the recommendation system. Particularly, there are few methods for extracting different types of data commonly existing in the recommendation system.

SUMMARY

To overcome the above shortcomings in the prior art, the present disclosure provides a personalized comment recommendation method based on a link prediction model of a graph bidirectional aggregation network, which can process different types of data to make a final result more representative.

The technical solution used in the present disclosure to resolve the technical problem thereof is as follows:

A personalized comment recommendation method based on a link prediction model of a graph bidirectional aggregation network includes the following steps:

a) A user-comment bipartite graph, a social network, and a forwarding network are built based on specific comment content, a user concern relationship, and a comment forwarding relationship.

b) A comment made by a user is converted into an N-dimensional original comment feature $h_{com}$, and an original feature $h_{user}$ of the user is initialized.

c) A comment node is randomly deleted from the user-comment bipartite graph and an aggregated feature $aggh_{user}^i$ of an $i^{th}$ user is calculated according to a formula $aggh_{user}^i = \text{SELU}(W_{agg} \cdot \text{concat}(h_{user}^i, \text{aggregate}(\{h_{com}^j, \forall j \in N_{com}(i)\})))$, where the aggregated feature of all users is represented by $aggh_{user}$, $\text{SELU}(\cdot)$ represents an activation function, $W_{agg}$ represents a weight of a feature extraction part, $\text{concat}(\cdot)$ represents a splicing function, $h_{user}^i$ represents a user feature of an $i^{th}$ node, $h_{com}^j$ represents a comment feature of a $j^{th}$ node, $N_{com}(i)$ represents a number of comment nodes associated with an $i^{th}$ user node.

aggregate represents an aggregation function, namely, $$\text{aggregate} = \frac{1}{N_{com}(i)} \cdot \sum_{j=0}^{N_{com}(i)} \text{ReLU}(w \cdot h_{com}^j + b),$$

where $\text{ReLU}(\cdot)$ represents an activation function, w represents a weight in the aggregate function, and b represents an offset in the aggregate function.

d) A fused neighbor node feature $aggh_{user}^i$ of the $i^{th}$ user is calculated according to a formula $aggh_{user}^i = \text{SELU}(\Sigma_{j=0}^N \alpha_{ij} \cdot W_{agg} \cdot h_{user}^j)$, where $\alpha_{ij}$ represents an attention coefficient of associating the $i^{th}$ user and a $j^{th}$ comment edge. and $h_{user}^i$ represents a user feature of the $j^{th}$ node.

e) A new comment feature $aggh_{com}^i$ of the $i^{th}$ user is calculated according to a formula $aggh_{com}^i = \text{SELU}(W_{agg} \cdot \text{aggregate}(\{aggh_{com}^j - h_{user}^j, \forall j \in N_{user}(i)\}))$ where new comment features of all the users are represented by $aggh_{com}$, $aggh_{user}^i$ represents the fused neighbor node feature of the $j^{th}$ user, and $N_{user}(i)$ represents a number of user nodes associated with an $i^{th}$ comment node.

f) A loss function value $loss_{agg}$ of a feature aggregation part is calculated according to a formula $loss_{agg} = \text{smooth}_{L_1}(h_{com}, aggh_{com})$, where $\text{smooth}_{L_1}(\cdot)$ represents a loss function, $h_{com}$ represents comment features of all nodes, and a model of the feature extraction part is established.

g) Neighbor features are aggregated by using a GraphSAGE algorithm according to a formula $preh = \text{Graph}_{SAGE}(g_{retweet}, aggh_{user})$ to obtain a user feature preh, where $g_{retweet}$ represents a graph structure of the forwarding network.

h) A score score of each edge in a positive-sample forwarding network in a form of an inner product is calculated according to a formula $score = preh_u \cdot preh_v$, where $preh_u$ represents a user node feature on a left side of a positive-sample edge, and $preh_v$ represents a user node feature on a right side of the positive-sample edge. A score score' of each edge in a negative-sample forwarding network in the form of an inner product is calculated according to a formula $score' = preh_u' \cdot preh_v'$, where $preh_u'$ represents a user node feature on a left side of a negative-sample edge, and $preh_v'$ represents a node feature on a right side of the negative-sample edge.

i) A loss function value $loss_{pre}$ of a link prediction part is calculated according to a formula $loss_{pre} = \max(0, M - score + score')$, where M represents a boundary value, and M=1 is set to establish a model of the link prediction part.

j) A total loss Loss is calculated according to a formula $\text{Loss} = loss_{agg} \times \text{agg} + loss_{pre} \times \text{pre}$, where agg represents the weight of the feature extraction part, and pre represents a weight of the link prediction part.

k) Steps c) to j) are repeated no less than N times to complete model training and optimization.

l) A recommendation list is generated in descending order based on the score score in step h), and a recommendation is made based on the list.

Preferably, in step a), a negative sample of the forwarding network is constructed by using a negative sampling algorithm, where K represents a parameter in negative sampling and $K_{=5}$.

Further, in step b), the comment made by the user is converted into a 64-dimensional original comment feature $h_{com}$ by using a Doc2Vec model.

Further, in step c), the comment node is randomly deleted from the user-comment bipartite graph based on a probability of 60%.

Further, in step d), $\alpha_{ij}$ is calculated by using an attention weight calculation method in a Graph Attention Network (GAT) algorithm.

Preferably, in step j), agg=1 and pre=2.

Preferably, in step k), a value of N is 100.

The present disclosure has the following beneficial effects: In a user-comment bipartite graph, comment features are aggregated into a user feature. A social network is used to fuse a neighbor feature of a user to obtain an embedding representation of the user. Subsequently, the embedding representation of the user is aggregated into a comment after an original feature of the user is removed, and the embedding representation of the user is adjusted based on a difference before and after comment aggregation. On this basis, a forwarding network is used to calculate a score of an edge based on an inner product of user node features at both ends of the edge, and finally make a recommendation based on the score. A recommendation system is used to help the user make no response and convert a comment recommendation task into a link prediction task between users in a small range. A feature extraction method capable of processing different types of data is provided, making the final result more representative.

DETAILED DESCRIPTION OF THE EMBODIMENTS

Figure 1:
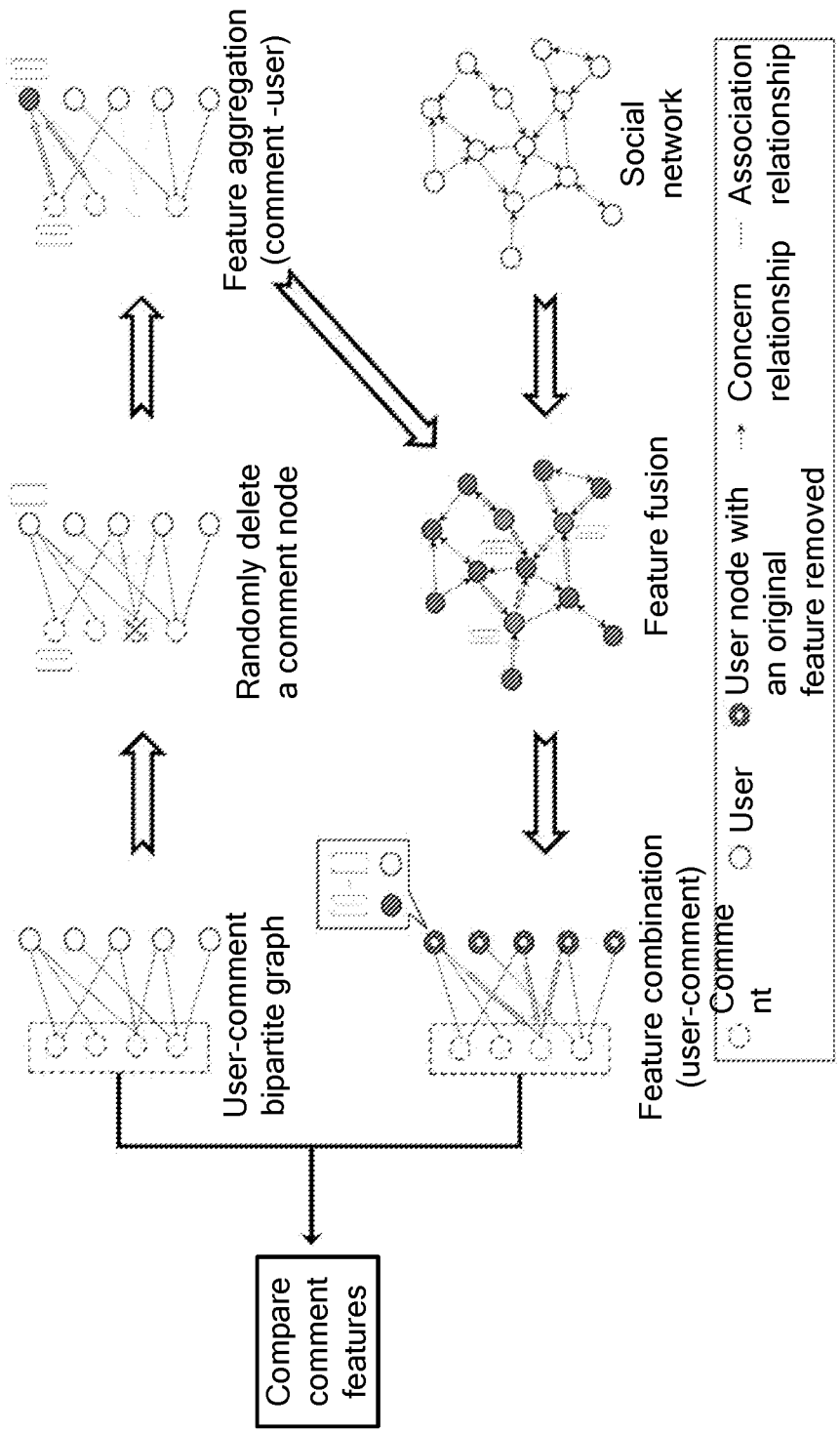
FIG. 1 is a flowchart of feature extraction according to the present disclosure.
Figure 2:
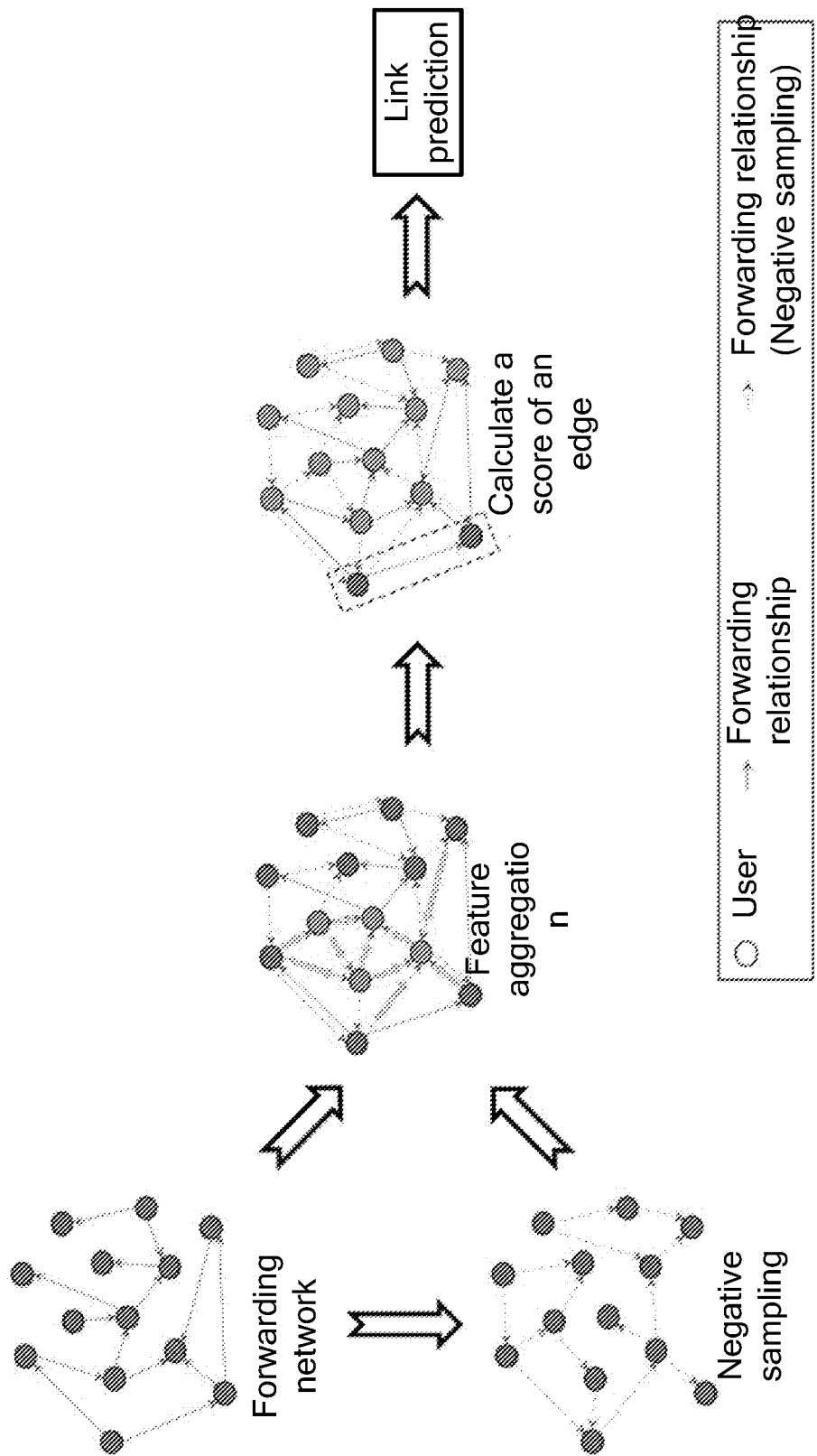
FIG. 2 is a flowchart of link prediction according to the present disclosure.
Figure 3:
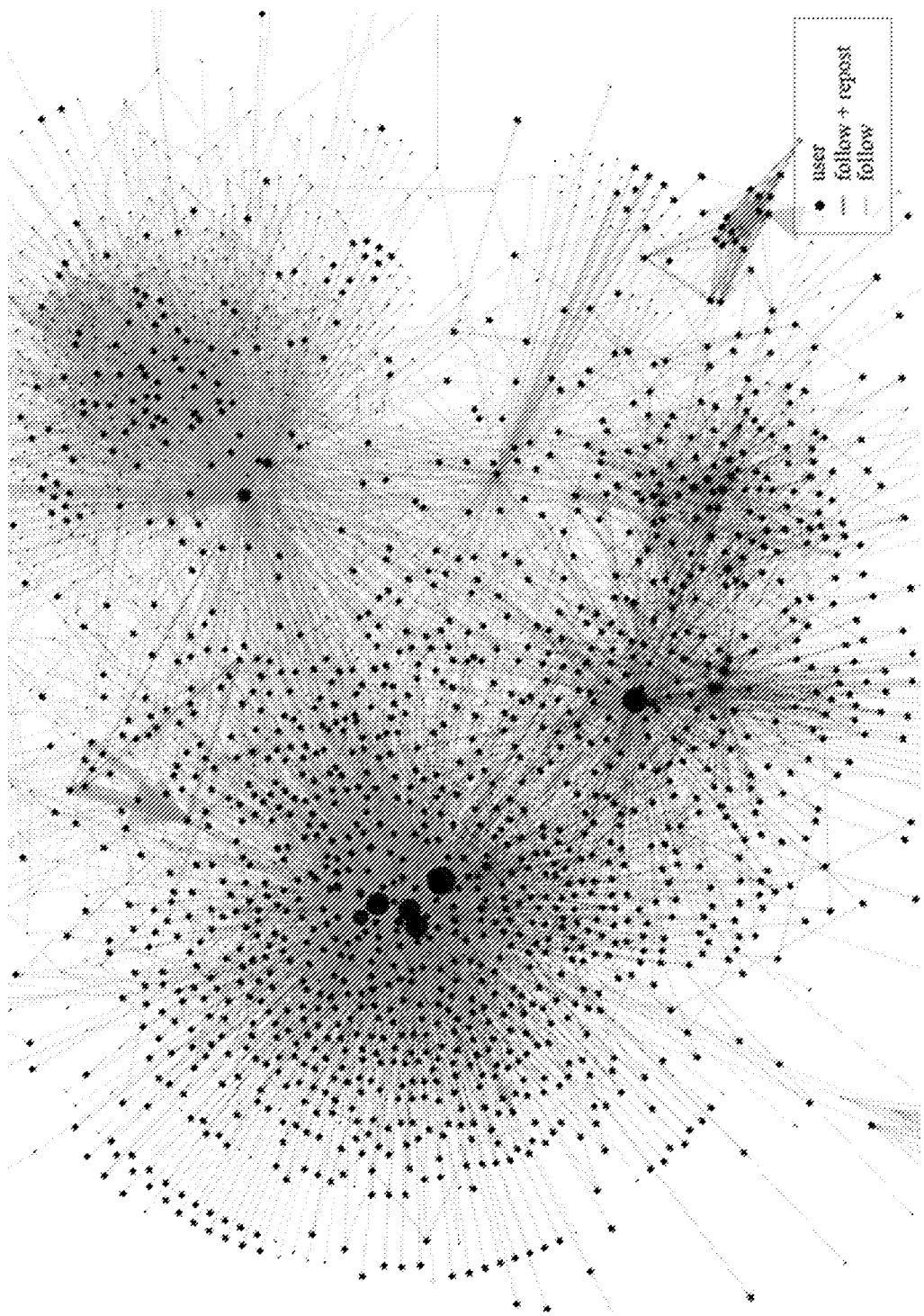
FIG. 3 shows a social network and a forwarding network according to the present disclosure.

The present disclosure is further described below by referring to FIG. 1, FIG. 2, and FIG. 3.

A personalized comment recommendation method based on a link prediction model of a graph bidirectional aggregation network includes the following steps:

a) A user-comment bipartite graph, a social network, and a forwarding network are built based on specific comment content, a user concern relationship, and a comment forwarding relationship.

b) A comment made by a user is converted into an N-dimensional original comment feature $h_{com}$, and the original feature $h_{user}$ of the user is initialized.

c) In the user-comment bipartite graph, comment node features are aggregated into a user node. Specifically, a comment node is randomly deleted from the user-comment bipartite graph, and aggregated feature $aggh_{user}^{i}$ of an $i^{th}$ user is calculated according to the formula $aggh_{user}^{i}$=SELU $(W_{agg} \cdot \text{concat}(h_{user}^{i}, \text{aggregate}(\{h_{com}^{j}, \forall j \in N_{com}(i)\})))$, where an aggregated feature of all users is represented by $aggh_{user}$, SELU(·) represents an activation function, $W_{agg}$ represents a weight of a feature extraction part, concat(·) represents a splicing function, $h_{user}^{i}$ represents a user feature of an $i^{th}$ node, $h_{com}^{j}$ represents a comment feature of a $j^{th}$ node, $N_{com}(i)$ represents a number of comment nodes associated with an $i^{th}$ user node.

aggregate represents an aggregation function, namely, $$\text{aggregate} = \frac{1}{N_{com}(i)} \cdot \sum_{j=0}^{N_{com}(i)} \text{ReLU}(w \cdot h_{com}^{j} + b),$$

where ReLU(·) represents an activation function, w represents a weight in the aggregate function, and b represents an offset in the aggregate function.

d) In the social network, a neighbor node feature is further fused to build a final embedding representation of the user. Specifically, the fused neighbor node feature $aggh_{user}^{i}$ of the $i^{th}$ user is calculated according to the formula $aggh_{user}^{i}$=SELU$(\Sigma_{j=0}^{N(i)} \alpha_{ij} \cdot W_{agg} \cdot h_{user}^{j})$, where $\alpha_{ij}$ represents an attention coefficient of associating the $i^{th}$ user and a $j^{th}$ comment edge, and $h_{user}^{j}$ represents a user feature of the $j^{th}$ node.

e) To ensure the effectiveness of a feature extraction result, after a user feature is removed from a final representation of the user, the user feature is fused to the comment node to generate a new comment feature $aggh_{com}$. Specifically, the new comment feature $aggh_{com}^{i}$ of the $i^{th}$ user is calculated according to the formula $aggh_{com}^{i}$=SELU $(W_{agg} \cdot \text{aggregate}(\{aggh_{user}^{j} - h_{user}^{j}, \forall j \in N_{user}(i)\}))$, where new comment features of all the users are represented by $aggh_{com}$, $aggh_{user}^{j}$ represents the fused neighbor node feature of the $j^{th}$ user, and $N_{user}(i)$ represents a number of user nodes associated with an $i^{th}$ comment node.

F) An original comment feature is compared with the generated comment feature, and the loss function value $loss_{agg}$ of a feature aggregation part is calculated according to the formula $loss_{agg}$=smooth$_{L_1}(h_{com}, aggh_{com})$, where smooth$_{L_1}$(·) represents a loss function and $h_{com}$ represents comment features of all nodes. So far, a model of the feature extraction part is established.

g) In the forwarding network, neighbor node features are aggregated to obtain the user feature. Specifically, the neighbor features are aggregated by using a GraphSAGE algorithm according to the formula preh=Graph$_{SAGE}(g_{retweet}, aggh_{user})$ to obtain the user feature preh, where $g_{retweet}$ represents a graph structure of the forwarding network.

h) Score score of each edge in a positive-sample forwarding network is calculated in the form of an inner product according to the formula score=preh$_u$·preh$_v$, where preh$_u$ represents a user node feature on a left side of a positive-sample edge, and preh$_v$ represents a user node feature on a right side of the positive-sample edge. The score score' of each edge in a negative-sample forwarding network is calculated in the form of an inner product according to the formula score'=preh$_u$'·preh$_v$', where preh$_u$' represents a user node feature on a left side of a negative-sample edge, and preh$_v$' represents a node feature on a right side of the negative-sample edge.

i) Loss function value $loss_{pre}$ of a link prediction part is calculated according to the formula $loss_{pre}$=max(0, M−score+score'), where M represents a boundary value, and M=1 is set to establish a model of the link prediction part.

j) Total loss Loss is calculated according to the formula Loss=$loss_{agg}$×agg+$loss_{pre}$×pre, where agg represents the weight of the feature extraction part and pre represents a weight of the link prediction part.

k) Steps c) to j) are repeated no less than N times to complete model training and optimization.

l) A recommendation list is generated in descending order based on the score score in step h), and a recommendation is made based on the list.

In a user-comment bipartite graph, comment features are aggregated into a user feature. A social network is used to fuse a neighbor feature of a user to obtain an embedding representation of the user. Then, the embedding representation of the user is aggregated into a comment after an original feature of the user is removed, and the embedding representation of the user is adjusted based on the difference before and after comment aggregation. On this basis, a forwarding network is used to calculate a score of an edge based on an inner product of user node features at both ends of the edge, and finally make a recommendation based on the score. The present disclosure focuses on the problem of Internet "trolls" in comment recommendations. A recommendation system is used to help the user make no response and convert a comment recommendation task into a link prediction task between users in a small range. A feature extraction method capable of processing different types of data is provided, making the final result more representative.

Embodiment 1

In step a), a negative sample of the forwarding network is constructed by using a negative sampling algorithm, where K represents a parameter in negative sampling and $K_{=5}$.

Embodiment 2

In step b), the comment made by the user is converted into a 64-dimensional original comment feature $h_{com}$ by using a Doc2Vec model.

Embodiment 3

In step c), the comment node is randomly deleted from the user-comment bipartite graph based on a probability of 60%.

Embodiment 4

In step d), $\alpha_{ij}$ is calculated by using a calculation method of an attention weight in a GAT algorithm.

Embodiment 5

In step j), agg=1 and pre=2.

Embodiment 6

In step k), a value of N is 100.

Taking a comment in a microblog as an example, the following describes an implementation of the present disclosure:

A user-comment bipartite graph, a social network, and a forwarding network are built based on specific comment content in the microblog (Weibo), a user concern relationship corresponding to the specific comment content, and a corresponding comment forwarding relationship. In addition, for the forwarding network, a negative sample is constructed by using a negative sampling technology. The social network and the forwarding network are shown in FIG. 3. Comment content made by a user is converted into a 64-dimensional original comment feature $h_{com}$ by using a Doc2Vec model, and the original feature $h_{user}$ of the user is initialized.

In the user-comment bipartite graph, comment node features are aggregated into a user node by taking the user as a central node. Feature information of the original comment $h_{com}$ is accumulated and averaged to obtain aggregated information of a corresponding comment feature of an $i^{th}$ user. After that, the original feature of the user and an aggregated comment feature are added up to obtain the corresponding user feature $aggh_{user}^{i}$ of the $i^{th}$ user by using the activation function SELU.

In the social network, the weight $\alpha_{ij}$ of an impact of a neighbor node on the central node is calculated to obtain a user feature containing a neighbor feature, and $aggh_{user}^{i}$ is updated. In the user-comment bipartite graph, a comment is taken as the central node to calculate a difference between $aggh_{user}$ and $h_{user}$, and a new comment feature $aggh_{com}$ is obtained according to the above mentioned aggregation process. Finally, $aggh_{com}$ is compared with $h_{com}$, and a loss function value of a feature aggregation part is calculated by using $loss_{agg}$ to continuously update the user feature $aggh_{user}$ in the user-comment bipartite graph.

In the forwarding network, a GraphSAGE algorithm is used to aggregate neighbor features of the user to obtain preh, and the score score of an edge between the user u and user v in the forwarding network is calculated in a form of an inner product. Positive and negative samples are compared, and a loss function value of a link prediction part is calculated by using $loss_{pre}$.

Finally, the feature aggregation part and the link prediction part are correlated through multi-task learning, such that the results of the two parts affect each other. Then a personalized comment recommendation is made based on the score score.

The method in the present disclosure is compared with traditional graph embedding models (DeepWalk, Node2Vec, SDNE, LINE) and graph neural network models (GCN, GraphSAGE, GAT, AGNN) to prove the effectiveness of the method in the present disclosure. Comparison results are shown in Table 1, where HR@K represents a hit rate of the first K articles and is used to measure the accuracy of a recommendation result, and NDCG@K represents the position of the recommendation result in a recommendation list and is used to measure the stability of the recommendation result.

The method in the present disclosure adopts an "aggregation-reverse aggregation" manner. After an association relationship is encoded, an attention mechanism is used to enhance the learning of a node feature by the model. Referring to microblog recommendations and evaluation indicators in Table 1, more comments meeting user preferences in the generated recommendation list are recommended. In addition, the quality of the recommendation result is related to the position of recommended content in the list. More content meeting the user preferences is recommended. However, because of the short content and a low behavioral cost of a comment recommendation, the requirement for whether a comment in the comment recommendation is in the most appropriate position of the list is not as high as that for a product recommendation or a music recommendation. Therefore, the method in the present disclosure allows some comments to be less prominent in the list but does not allow arranging content that users may like at the bottom of the list. Therefore, it can be seen by comparing the last line with other lines that although the value of the indicator NDCG@K is relatively small and a position of a recommended comment within a browsing range of the user is not stable, a large value of the indicator HR@K can reflect that a comment recommended by this model is more consistent with a preference of the user and easier to be seen by the user.

TABLE 1

Comparison results of models

| Model | HR@3 | NDCG@3 | HR@5 | NDCG@5 | HR@10 | NDCG@10 |
|---|---|---|---|---|---|---|
| DeepWalk | 0.677 | 0.065 | 0.773 | 0.066 | 0.831 | 0.068 |
| Node2Vec | 0.691 | 0.156 | 0.785 | 0.161 | 0.789 | 0.167 |
| SDNE | 0.639 | 0.109 | 0.662 | 0.113 | 0.742 | 0.119 |
| LINE | 0.663 | 0.166 | 0.709 | 0.173 | 0.703 | 0.169 |
| GCN | 0.429 | 0.637 | 0.487 | 0.638 | 0.477 | 0.612 |
| GraphSAGE | 0.512 | 0.684 | 0.515 | 0.721 | 0.532 | 0.759 |
| GAT | 0.421 | 0.577 | 0.472 | 0.579 | 0.462 | 0.583 |
| AGNN | 0.317 | 0.768 | 0.359 | 0.768 | 0.363 | 0.778 |
| GBAN | 0.848 | 0.503 | 0.864 | 0.507 | 0.866 | 0.514 |

Finally, it should be noted that the above descriptions are only preferred embodiments of the present disclosure and are not intended to limit the present disclosure. Although the present disclosure is described in detail by referring to the foregoing embodiments, a person skilled in the art can still make modifications to the technical solutions described in the foregoing embodiments, or make equivalent replacements of some technical features therein. Any modifications, equivalent substitutions, improvements, and the like made within the spirit and principle of the present disclosure should be included within the protection scope of the present disclosure.

What is claimed is:

1. A personalized comment recommendation method based on a link prediction model of a graph bidirectional aggregation network, comprising the following steps:

a) building a user-comment bipartite graph, a social network, and a forwarding network based on specific comment content, a user concern relationship, and a comment forwarding relationship;

b) converting a comment made by a user into an N-dimensional original comment feature $h_{com}$, and initializing an original feature $h_{user}$ of the user;

c) randomly deleting a comment node from the user-comment bipartite graph, and calculating an aggregated feature $aggh_{user}^i$ of an $i^{th}$ user according to a formula $aggh_{user}^i = SELU(W_{agg} \cdot concat(h_{user}^i, aggregate(\{h_{com}^i, \forall j \in N_{com}(i)\})))$, wherein an aggregated feature of all users is represented by $aggh_{user}$, $SELU(\cdot)$ represents an activation function, $W_{agg}$ represents a weight of a feature extraction part, $concat(\cdot)$ represents a splicing function, $h_{user}^i$ represents a user feature of an $i^{th}$ node, $h_{com}^j$ represents a comment feature of a $j^{th}$ node, $N_{com}(i)$ represents a quantity of comment nodes associated with an $i^{th}$ user node, and aggregate represents an aggregation function, namely, $$\text{aggregate} = \frac{1}{N_{com}(i)} \cdot \sum_{j=0}^{N_{com}(i)} ReLU(w \cdot h_{com}^j + b),$$

wherein $ReLU(\cdot)$ represents an activation function, w represents a weight in the aggregate function, and b represents an offset in the aggregate function;

d) calculating a fused neighbor node feature $aggh_{user}^i$, of the $i^{th}$ user according to a formula $aggh_{user}^i = SELU(\sum_{j=0}^{N(i)} \alpha_{ij} \cdot W_{agg} \cdot h_{user}^j)$, wherein $\alpha_{ij}$ represents an attention coefficient of associating the $i^{th}$ user and a $j^{th}$ comment edge, and $h_{user}^j$ represents a user feature of the $j^{th}$ node;

e) calculating a new comment feature $aggh_{com}^i$ of the $i^{th}$ user according to a formula $aggh_{com}^i = SELU$ ($W_{agg} \cdot aggregate(\{aggh_{user}^j - h_{user}^j, \forall j \in N_{user}(i)\})$), wherein new comment features of all the users are represented by $aggh_{com}$, $aggh_{user}^j$ represents the fused neighbor node feature of the $j^{th}$ user, and $N_{user}(i)$ represents a quantity of user nodes associated with an $i^{th}$ comment node;

f) calculating a loss function value $loss_{agg}$ of a feature aggregation part according to a formula $loss_{agg} = smooth_{L_1}(h_{com}, aggh_{com})$, wherein $smooth_{L_1}(\cdot)$ represents a loss function, $h_{com}$ represents comment features of all nodes; and establishing a model of the feature extraction part;

g) aggregating neighbor features by using a GraphSAGE algorithm according to a formula $preh = Graph_{SAGE}$ ($g_{retweet}, aggh_{user}$) to obtain a user feature preh, wherein $g_{retweet}$ represents a graph structure of the forwarding network;

h) calculating a score score of each edge in a positive-sample forwarding network in a form of an inner product according to a formula $score = preh_u \cdot preh_v$, wherein $preh_u$ represents a user node feature on a left side of a positive-sample edge, and $preh_v$ represents a user node feature on a right side of the positive-sample edge; and calculating a score score' of each edge in a negative-sample forwarding network in the form of an inner product according to a formula $score' = preh_u' \cdot preh_v'$, wherein $preh_u'$ represents a user node feature on a left side of a negative-sample edge, and $preh_v'$ represents a node feature on a right side of the negative-sample edge;

i) calculating a loss function value $loss_{pre}$ of a link prediction part according to a formula $loss_{pre} = max(0, M - score + score')$, wherein M represents a boundary value, and setting M=1 to establish a model of the link prediction part;

j) calculating a total loss Loss according to a formula $Loss = loss_{agg} \times agg + loss_{pre} \times pre$, wherein agg represents the weight of the feature extraction part, and pre represents a weight of the link prediction part;

k) repeating steps c) to j) for no less than N times to complete model training and optimization; and l) generating a recommendation list in descending order based on the score score in step h), and making a recommendation based on the list.

2. The personalized comment recommendation method based on the link prediction model of the graph bidirectional aggregation network according to claim 1, wherein in step a), a negative sample of the forwarding network is constructed by using a negative sampling algorithm, wherein K represents a parameter in negative sampling and K=5.

3. The personalized comment recommendation method based on the link prediction model of the graph bidirectional aggregation network according to claim 1, wherein in step b), the comment made by the user is converted into a 64-dimensional original comment feature $h_{com}$ by using a Doc2Vec model.

4. The personalized comment recommendation method based on the link prediction model of the graph bidirectional aggregation network according to claim 1, wherein in step c), the comment node is randomly deleted from the user-comment bipartite graph based on a probability of 60%.

5. The personalized comment recommendation method based on the link prediction model of the graph bidirectional aggregation network according to claim 1, wherein in step d), $\alpha_{ij}$ is calculated by using an attention weight calculation method in a Graph Attention Network (GAT) algorithm.

6. The personalized comment recommendation method based on the link prediction model of the graph bidirectional aggregation network according to claim 1, wherein in step j), agg=1, and pre=2.

7. The personalized comment recommendation method based on the link prediction model of the graph bidirectional aggregation network according to claim 1, wherein in step k), a value of N is 100.

* * * * *